United States Patent
Jundi et al.

(10) Patent No.: US 11,594,912 B2
(45) Date of Patent: Feb. 28, 2023

(54) SMART ENERGY MANAGEMENT SYSTEM FOR SELF-SUFFICIENT SOLAR HOME

(71) Applicant: King Fahd University of Petroleum and Minerals, Dhahran (SA)

(72) Inventors: Abdulaziz Najeeb Mohammad Jundi, Dhahran (SA); Ibrahim Alobaidan, Dhahran (SA); Abdulaziz Al Harbi, Dhahran (SA); Ziyad Althobaity, Dhahran (SA); Ali Bin Ladin, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 678 days.

(21) Appl. No.: 15/961,492

(22) Filed: Apr. 24, 2018

(65) Prior Publication Data

US 2018/0309291 A1 Oct. 25, 2018

Related U.S. Application Data

(60) Provisional application No. 62/489,004, filed on Apr. 24, 2017.

(51) Int. Cl.
*H02J 13/00* (2006.01)
*H02J 7/35* (2006.01)
(Continued)

(52) U.S. Cl.
CPC ........ *H02J 13/00004* (2020.01); *G05B 15/02* (2013.01); *H02J 1/14* (2013.01);
(Continued)

(58) Field of Classification Search
CPC ..... H02J 3/14; H02J 3/383; H02J 7/35; G05B 15/02
(Continued)

(56) References Cited

U.S. PATENT DOCUMENTS

2012/0068534 A1 3/2012 Pan
2015/0081127 A1 3/2015 Bhageria et al.
(Continued)

FOREIGN PATENT DOCUMENTS

GB 2486392 A 6/2012

OTHER PUBLICATIONS

Sharp Electronics GMBH, "Enter a smart future", Oct. 10, 2016, pp. 1-20, http://www.sharp.co.uk/sharp/media/GB/assets/161011_Sharp_Smart_Chap_Broschure_4MB_EN.pdf.
Su-Kam, "India's-Most-Intelligent Solar Home UPS", Sep. 3, 2015, pp. 1-16, http://www.su-kam.com/Upload/UpProductCatalogue/brainy-eco-ups-brochure.pdf.

*Primary Examiner* — Alfonso Perez Borroto
(74) *Attorney, Agent, or Firm* — Oblon, McClelland, Maier & Neustadt, L.L.P.

(57) ABSTRACT

An energy management system for an off-electric-grid solar house includes a battery pack that outputs a voltage based on load and has a linear relationship between output voltage and remaining capacity, and a solar energy power source that supplies electric power to be stored in the battery pack. One or more electric devices connected to the battery pack produce the load by drawing electric power from the battery pack. One or more sensors monitor conditions in the house. A control circuit is configured to control the one or more electric devices based on the monitored conditions and the remaining capacity in the battery pack, as the battery pack is charged by electricity from the solar energy power and discharged by load from the electric devices. The control circuit manages priority among the electric devices for changing operating status depending on remaining battery capacity.

2 Claims, 10 Drawing Sheets

(51) Int. Cl.
  *G05B 15/02*      (2006.01)
  *H02J 1/14*       (2006.01)
(52) U.S. Cl.
  CPC .......... *H02J 7/35* (2013.01); *H02J 13/00001*
    (2020.01); *G05B 2219/2642* (2013.01); *H02J*
    *2310/14* (2020.01); *Y02B 70/30* (2013.01);
    *Y02B 70/3225* (2013.01); *Y04S 20/222*
    (2013.01); *Y04S 20/242* (2013.01)
(58) Field of Classification Search
  USPC .......................................................... 307/19
  See application file for complete search history.

(56) References Cited

U.S. PATENT DOCUMENTS

| | | | |
|---|---|---|---|
| 2015/0162784 A1* | 6/2015 | Kydd | B60L 53/20 |
| | | | 307/9.1 |
| 2015/0318705 A1* | 11/2015 | Lucas | H02J 3/383 |
| | | | 307/129 |
| 2016/0028271 A1* | 1/2016 | Smith | H02J 3/381 |
| | | | 320/101 |
| 2016/0036235 A1* | 2/2016 | Getsla | H02J 3/381 |
| | | | 307/80 |
| 2016/0241039 A1* | 8/2016 | Cheng | H02J 3/40 |
| 2018/0037121 A1* | 2/2018 | Narla | B60L 8/003 |
| 2018/0123348 A1* | 5/2018 | Narla | H02J 3/381 |
| 2018/0302029 A1* | 10/2018 | Hall | H02J 3/46 |

\* cited by examiner

SMART ENERGY MANAGEMENT SYSTEM FOR SELF-SUFFICIENT SOLAR HOME

CROSS-REFERENCE TO RELATED APPLICATIONS

This application claims the benefit of priority to provisional application No. 62/489,004 filed Apr. 24, 2017, the entire contents of which are incorporated herein by reference.

STATEMENT OF ACKNOWLEDGEMENT

The support provided by King Fahd University of Petroleum & Minerals (KFUPM), Dhahran, Saudi Arabia, is gratefully acknowledged.

BACKGROUND

Field of the Invention

The present disclosure relates generally to a smart energy management system and a method for smart energy management of an off-grid solar building.

Description of the Related Art

Various methods for controlling household, residential and commercial electric powered home article including kitchen appliances, HVAC, water heater, washer/dryer, entertainment equipment, and lighting have been proposed to help conserve energy usage. Some electric powered appliances, lights, video recorders, and even some cooking devices, may be scheduled to be turned on and off at certain times. Some electric powered articles, such as a heating/air conditioning unit may be adjusted at various times throughout each day.

For various reasons, household energy sources are gradually being changed from sources that are based on non-renewable fuels to renewable and green energy sources. However, renewable and green energy sources have low efficiency and are inconsistent due to changing environmental conditions. An approach to accommodating for inconsistencies of renewable and green energy sources is to store electrical energy in energy storage units, such as rechargeable batteries and use the stored energy to power appliances. However, variations in usage of electric power by household articles and durable consumer goods, and inconsistencies in renewable and green energy sources will result in the storage devices having various states of charge.

There is a need to control household electric powered entities based on the state of charge of an energy storage device. Accordingly it is one object of the present disclosure to provide a smart energy management system and a method for smart energy management of an off-grid solar building The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1:
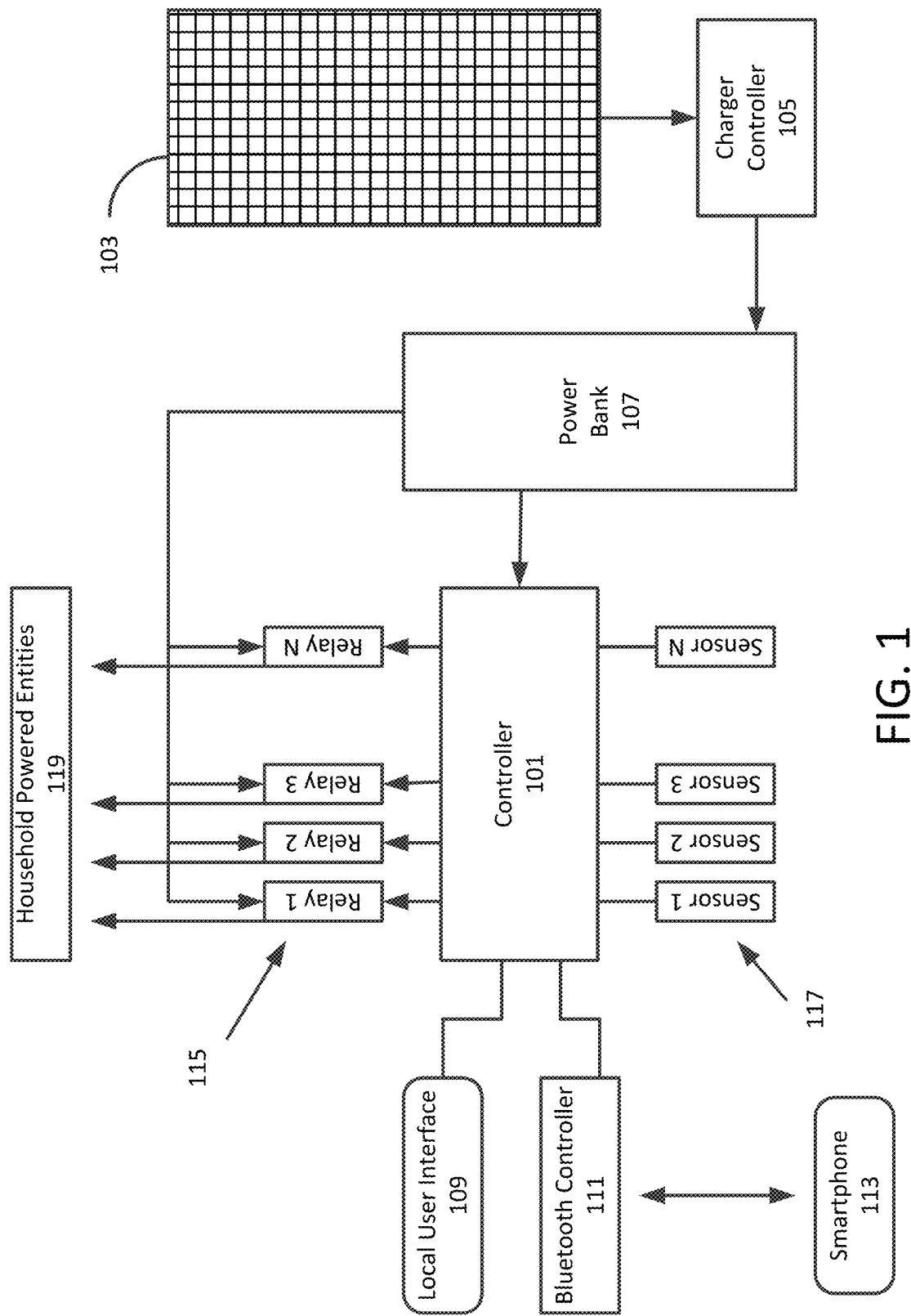
FIG. 1 is a block diagram of a smart energy management system in accordance with exemplary aspects of the disclosure.
Figure 2:
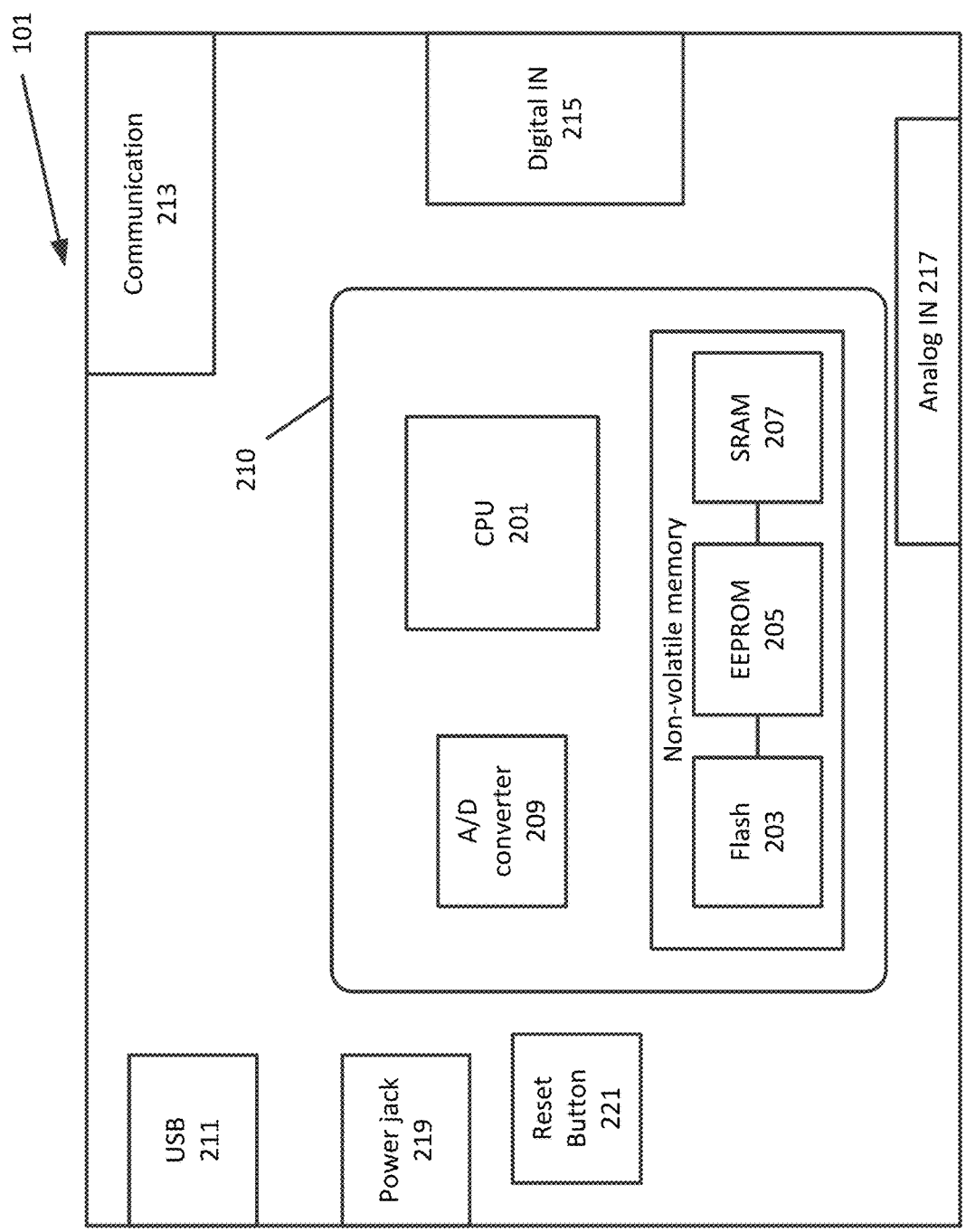
FIG. 2 is a block diagram of a control unit in accordance with exemplary aspects of the disclosure.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Referring now to the drawings, wherein like reference numerals designate identical or corresponding parts throughout several views, the following description relates to a system and method for smart energy management for an off-grid solar home. The method manages energy needs and operates at different operation modes depending on the remaining capacity of energy storage batteries.

A Smart Energy Management System for an off-grid solar building (e.g., a residence or house) is disclosed that takes advantage of a building's site, climate, and materials to minimize energy use. The system enables a high demand in consumption with a limited and inconsistent energy produced by solar systems. The smart energy management system ranks the priorities between electric devices. The system offers the client or resident different modes to run the house based on the level of storage in the battery.

The system tracks the amount of energy produced by the solar system, ranks appliances based on the most importance, and manages the operation of the appliances based on the remaining energy level. The system reduces the level of consumption without affecting the quality of life. The system provides communication with the house owner with an easy-to-use interface and supplies DC loads.

FIG. 1 is a block diagram of a smart energy management system for an off-grid smart house in accordance with exemplary aspects of the disclosure. Although the disclosed example is for a smart house, it should be understood that the disclosure applies to any building unit that is not connected to the electric grid but requires electricity to satisfy load demanded by electric devices. As a minimum, the building unit may include lighting.

An aspect is a smart house that relies on solar power instead of electric power from an electric grid. The solar power may be obtained by way of a solar power system that includes solar panels mounted to the house, in an area of land adjacent to the house, or on a separate adjacent building unit. The solar power system may include necessary wiring to transfer and control the generated electricity. The solar power system may include a cooling system, as necessary, to maintain the solar panels at a design operating temperature range.

Although the smart house is described with electric power received from solar power, other types of renewable energy sources may be used instead, or in combination with solar power. Other types of renewable energy sources include, but are not limited to, wind turbine-generators, and geothermal-based steam turbine generators.

In an exemplary aspect, the smart energy management system is controlled by a computer-based control system 101. The control system 101 receives sensor signals from one or more sensors 117 and controls power supply from a battery power bank 107 to household powered loads 119 based on the remaining amount of energy stored in the battery power bank 107. The control system 101 is configured to perform control of household electric loads 119 according to different operation modes. Various types of sensors 117 (Passive Infrared Sensor (PIR), Light Dependent Resistor (LDR), Humidity and Temperature Sensor, Air Quality, Current Sensor) may be installed in a smart house.

The control system 101 will issue commands to some loads based on the status of sensors 117. FIG. 1 shows solar panels in the form of photovoltaic (PV) panels 103 connected to a battery power bank 107 through a charge controller 105. Relays 115 are used to control DC household powered entities based on the remaining stored energy level in the battery. According to an exemplary aspect, all operations and modes may be displayed on a LCD screen 109. Access to the control system 101 through the LCD screen 109 may be secured with a password, PIN, or other authentication method.

In one embodiment, remote control of the smart energy management system may be performed by a smartphone 113, or equivalent interactive display device, that may communicate wirelessly, by a wireless network such as WiFi or Bluetooth. The smartphone 113 may provide a user interface that is similar to the interface presented by the LCD screen 109, or may provide a comprehensive user interface that enables setting up the energy management system, changing settings, as well as monitoring of sensors and other devices and control of electric devices. In some embodiments, the local user interface 109 may be an interface that accepts verbal commands, either directly to the interface, or by way of the Internet, using a service, such as Amazon Alexa, Google Home, Microsoft Cortana, Apple Home, or the like.

In one embodiment, the battery power bank 107 may include one or more 12V batteries. A typical 12V battery may have a nominal capacity of 12 Ah over a temperature range of −20° C. to 40° C., and preferably operate in a range of 15° C. to 25° C. The 12V battery has rated a self-discharge residue capacity above 87% after 90 days storage at 25° C.

The computer-based control system 101 may be based on a microcontroller. A microcontroller may contain one or more processor cores (CPUs) along with memory (volatile and non-volatile) and programmable input/output peripherals. Program memory in the form of flash, ROM, EPROM, or EEPROM is often included on chip, as well as a secondary RAM for data storage. In one embodiment, the computer-based system 101 is an Arduino Mega 2560 integrated circuit board 101 with an ATmega2560 microcontroller 210. The board includes 54 digital I/O pins 215, 16 analog inputs 217, 4 hardware serial ports 213, a USB connection 211, a power jack 219, and a reset button 221. Although the Arduino Mega 2560 is a widely used microcontroller-based board, it should be understood that other microcontroller configurations are possible. Variations can include the number of pins, whether or not the board includes communication ports or a reset button.

The ATmega2560 microcontroller is a 8-bit AVR RISC-based microcontroller having 256 KB flash memory 203, 8K SRAM 207, 4 KB EEPROM 205, 86 general purpose I/O lines, 32 general purpose registers, a real time counter, six flexible timer/counters, a 16-channel 10-bit A/D converter 209, and a JTAG interface for on-chip debugging. The microcontroller is a single SOC that achieves a throughput of 16 MIPS at 16 MHz and operates between 4.5 to 5.5 volts. The recommended input voltage is between 7-12V. Although the description is of a particular microcontroller product, it should be understood that other microcontrollers may be used. Microcontrollers vary based on the number of processing cores, size of non-volatile memory, the size of data memory, as well as whether or not it includes an A/D converter or D/A converter.

Figure 3:
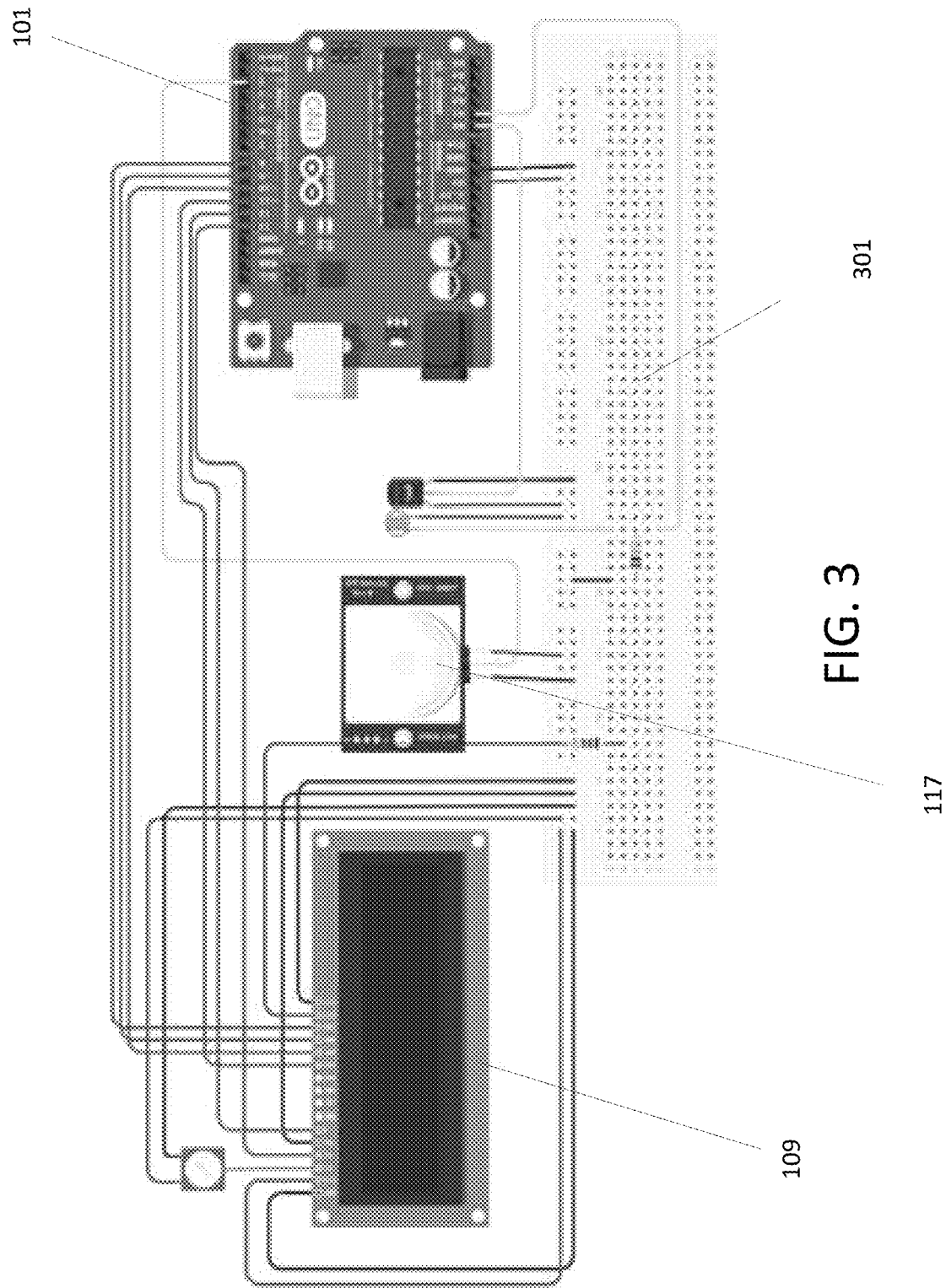
FIG. 3 is a circuit diagram for the smart energy management system of FIG. 1.

FIG. 3 is an example wiring diagram for an exemplary implementation of the smart energy management system. As in FIG. 1, the system includes controller 101, a local display panel 109, connected to each other, and various sensors 117 connected to the controller 101 by way of a connection panel 301.

Figure 4:
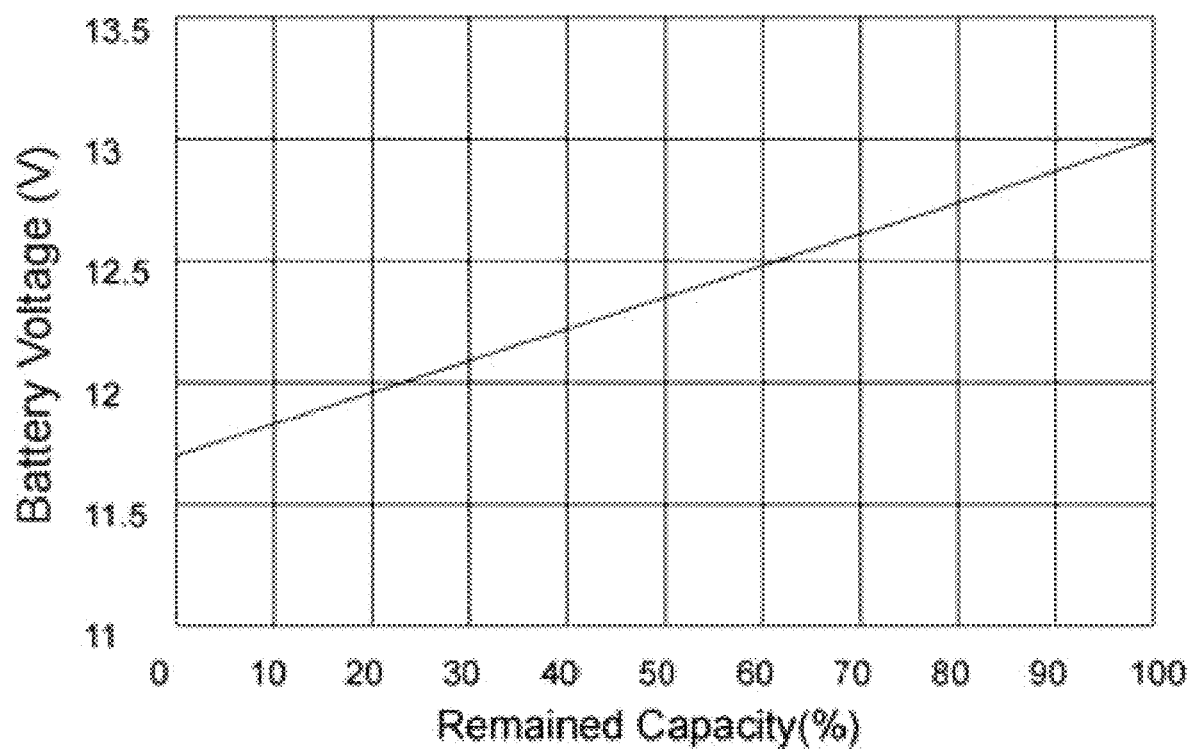
FIG. 4 is a chart of voltage vs. remaining capacity for a battery.

A volt rechargeable battery typically declines in its ability to provide output voltage as the remaining capacity decreases due to discharge. FIG. 4 is a graph showing the relationship between output voltage and remaining capacity in a 12V battery pack, such as that for the disclosed smart energy management system.

Because output voltage varies with the amount of energy being discharged by the battery, the disclosed smart energy management system controls load based on signals received from various sensors, in order to conserve energy usage, and also gives priority to individual energy consuming entities according to the remaining battery energy level.

Figure 5:
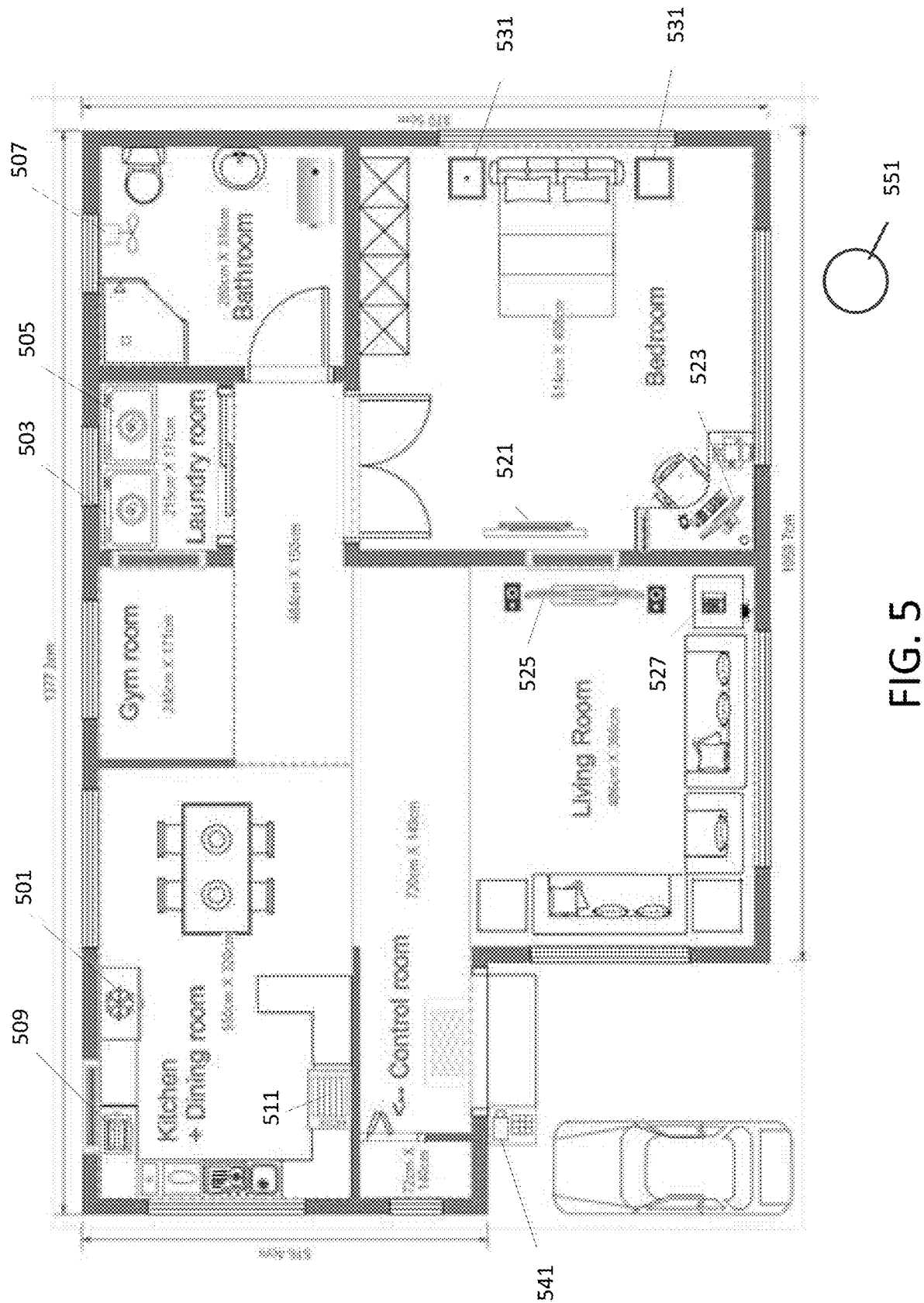
FIG. 5 is a floor plan for an exemplary building design.

FIG. 5 is a floor plan for an exemplary house design. The house may include a kitchen and dining room, a gym room, a laundry room, a bathroom, a bedroom, a living room, and a control room. However, a house design is not limited to these rooms or the number of rooms shown in the drawing. A house may include one or more bathrooms and one or more bedrooms. The kitchen and dining room may be separate rooms. Other types of rooms, such as a family room, an entertainment room, a library, and a home office may also be included. Also, a house design is not limited to the dimensions shown in the drawing. The house may include various types and numbers of electric devices that may place a load on the home electric power system. The house may include one or more air conditioning units 551. The air conditioning unit 551 may be a heat pump and may include a separate in-home air handler, as well as a separate heater. In some embodiments, a house may include an electric water heater. Particular rooms may include their own types of electric devices. The kitchen may include a refrigerator 501. In some embodiments the refrigerator 501 may include a built-in freezer. In some embodiments, the house may include a separate freezer unit. The kitchen may include any number of electric devices for use in preparing food, or even powering external devices, such as vacuum cleaners, entertainment devices such as smartphones, tablets, televisions, voice interfaces to the Internet, or other electric devices that may be plugged into electrical outlets, as the kitchen may be a center of household activities. Built-in cooking related electric devices may include a microwave oven 509, or equivalent high-power cooking appliance, an oven and a stove 511. The gym room may include electrical outlets that may be used for exercise equipment that requires electricity. The laundry room may include a washing machine 503 and a dryer 505, as well as its own electrical outlets. The bathroom may include a heating unit and fan 507, as well as electrical outlets. The bedroom may include an entertainment center 521 and office equipment 523, such as a computer and a printer. The living room may include another entertainment center 525 and other electric devices, such as a phone hub 527. In a garage, carport, or area where electric tools may be used, the house may include an electrical outlet(s) 541 for plugging in tools, or even a charging center for an electric vehicle. Lighting 531 may be provided throughout the house.

Figure 6:
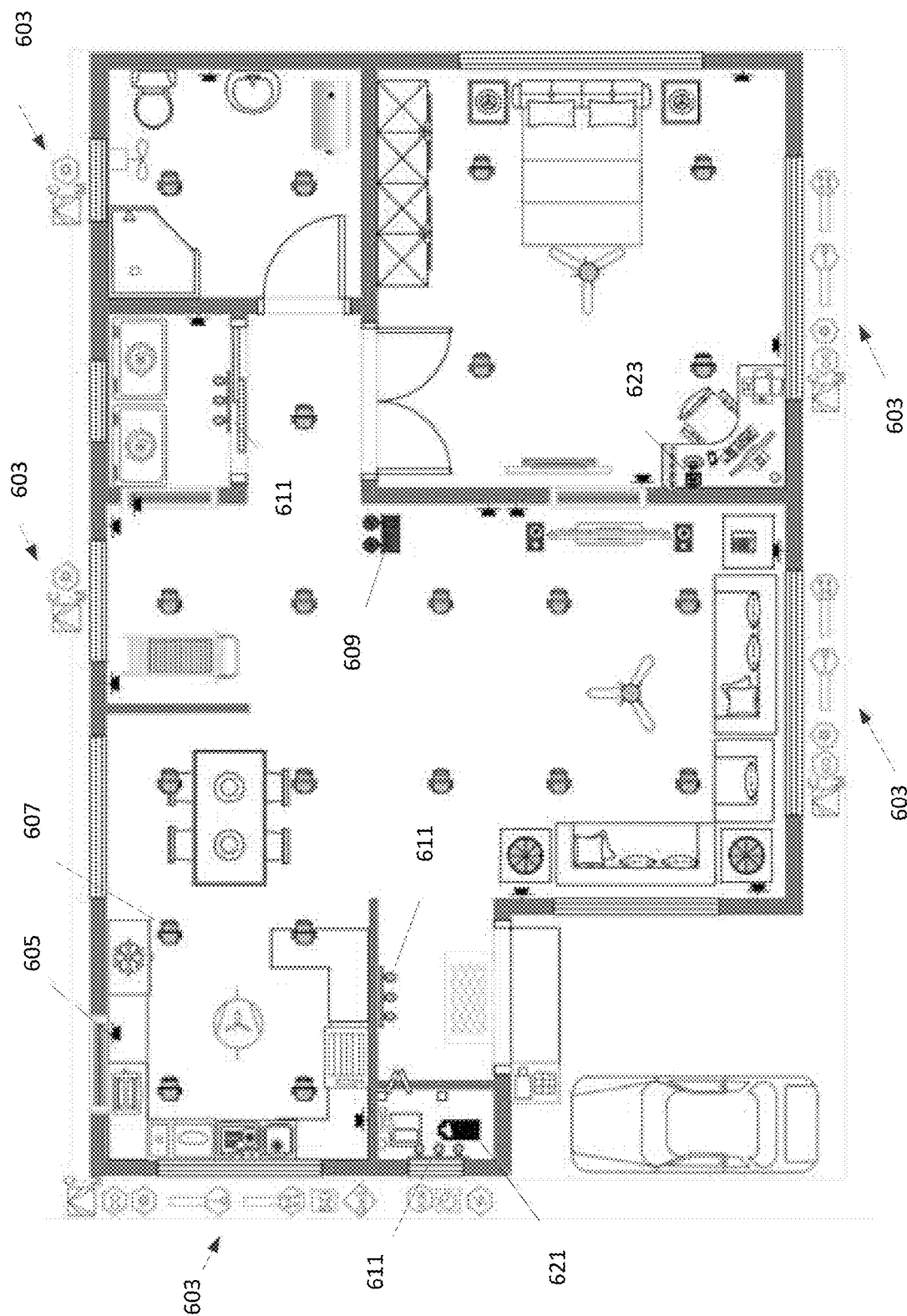
FIG. 6 is a floor plan for an exemplary building design showing sensor placement.

FIG. 6 is a floor plan for an exemplary house design showing sensor placement. Types of sensors that may be placed throughout the house, or at particular locations may include a temperature sensor, a motion sensor, a light sensor, an air quality sensor, and a current sensor. In some embodiments, at least some of the various sensors may be wirelessly connected. The battery bank 621 for the energy management system may be located in the control room. Temperature sensors and air quality sensors 603 may be placed in certain rooms or may be placed outdoors to measure environmental conditions. Motion sensors 605 may be placed in areas of the house where entry/exit of a person may be used to trigger availability of electricity for sets of electric devices and/or turning on or off of sets of electric devices. One or more light sensors 609 may be mounted to detect low light conditions in certain rooms, or generally in the house. Current sensors 611 may be placed near motor-operated equipment, as well as near the power source for the house to monitor the state of the energy management system.

An aspect is control of lighting operation based on signals from one or more motion sensors and signals from one or more light sensors. A light sensor may detect low light conditions. The motion sensor may be used to control lighting in sections of a house where movement of a person is detected. Control of lighting in various areas where lighting is needed or desired can help to minimize load due to light usage. A possible control of the lighting system operation may be as indicated in the table below. The table shows the value of the signal for a Light Dependent Resistor (LDR) as a light sensor, the value of the signal for a Passive Infrared Sensor (PIR) as a motion sensor, and the status of a section of lighting in a house.

TABLE 1

| Lighting System Operation | | |
|---|---|---|
| LDR | PIR | Status |
| 0 | 0 | OFF |
| 0 | 1 | ON |

TABLE 1-continued

| Lighting System Operation | | |
|---|---|---|
| LDR | PIR | Status |
| 1 | 0 | OFF |
| 1 | 1 | OFF |

Although the table indicates a single light sensor and a single motion sensor, the signals for each sensor may be average signals from a number of sensors in the entire house. Alternatively, the light sensor signal and the motion sensor signal may be for a single room, such that the status is for the lighting system in a single room, or section of a house.

An aspect is control of an entertainment system based on motion sensor signals and the remaining battery capacity. The motion sensor may be used to control operation of the entertainment system when motion of a person is detected. A possible control of the entertainment system operation may be as indicated in the table below. The table shows the value of the signal for a Passive Infrared Sensor (PIR) as a motion sensor. The entertainment system operation may remain off if the remaining battery charge is below a predetermined level.

TABLE 2

| Entertainment System Operation | | |
|---|---|---|
| Battery > 40% | PIR | Status |
| 0 | 0 | OFF |
| 0 | 1 | OFF |
| 1 | 0 | OFF |
| 1 | 1 | ON |

Although the table 2 shows a threshold of a state of charge of 40%, a lower state of charge may be possible, depending on the time of day. For example, a lower threshold may be permitted in the evening when the only other load on the energy source is the refrigerator.

An aspect is control of a washing Machine System Operation based on a current sensor and the remaining battery capacity. Control of a dryer system or other motor-operated appliance may be controlled in a similar manner. The current sensor may be used to control operation of the washing machine as long as the battery has sufficient charge above a predetermined level. A possible control of the washing machine operation may be as indicated in the table below. The table shows the value of the signal for the current sensor. The washing machine may remain off if the battery is below a predetermined level of charge and the current sensor indicates no current. The washing machine may be operational if the battery is above the predetermined level of charge. If the battery charge is below the predetermined level, but there is current to the washing machine, the washing machine should be shut down after it is finished washing.

TABLE 3

| Washing Machine System Operation | | |
|---|---|---|
| Battery > 60% | Current Sensor | Status |
| 0 | 0 | Not Available |
| 0 | 1 | Shut Down After Finish |

TABLE 3-continued

Washing Machine System Operation

| Battery > 60% | Current Sensor | Status |
|---|---|---|
| 1 | 0 | Available |
| 1 | 1 | Available |

Although the table shows a threshold of a state of charge for the battery of 60%, the threshold remaining charge may be a different amount depending on other conditions. For example, the threshold may be lower in a case where the only other load that is being placed on the energy source is the refrigerator, such as when operating a washing machine at night.

The control system 101 may use remaining battery charge level and priority level of electrical entities to control household electrical entities. The control system 101 may assign priority levels to the electrical entities. In some embodiments, priority levels for specific electrical entities may be assigned initial values, which may be adjusted by the control system 101 based on conditions such as time of day or status of other electrical entities.

Figure 7:
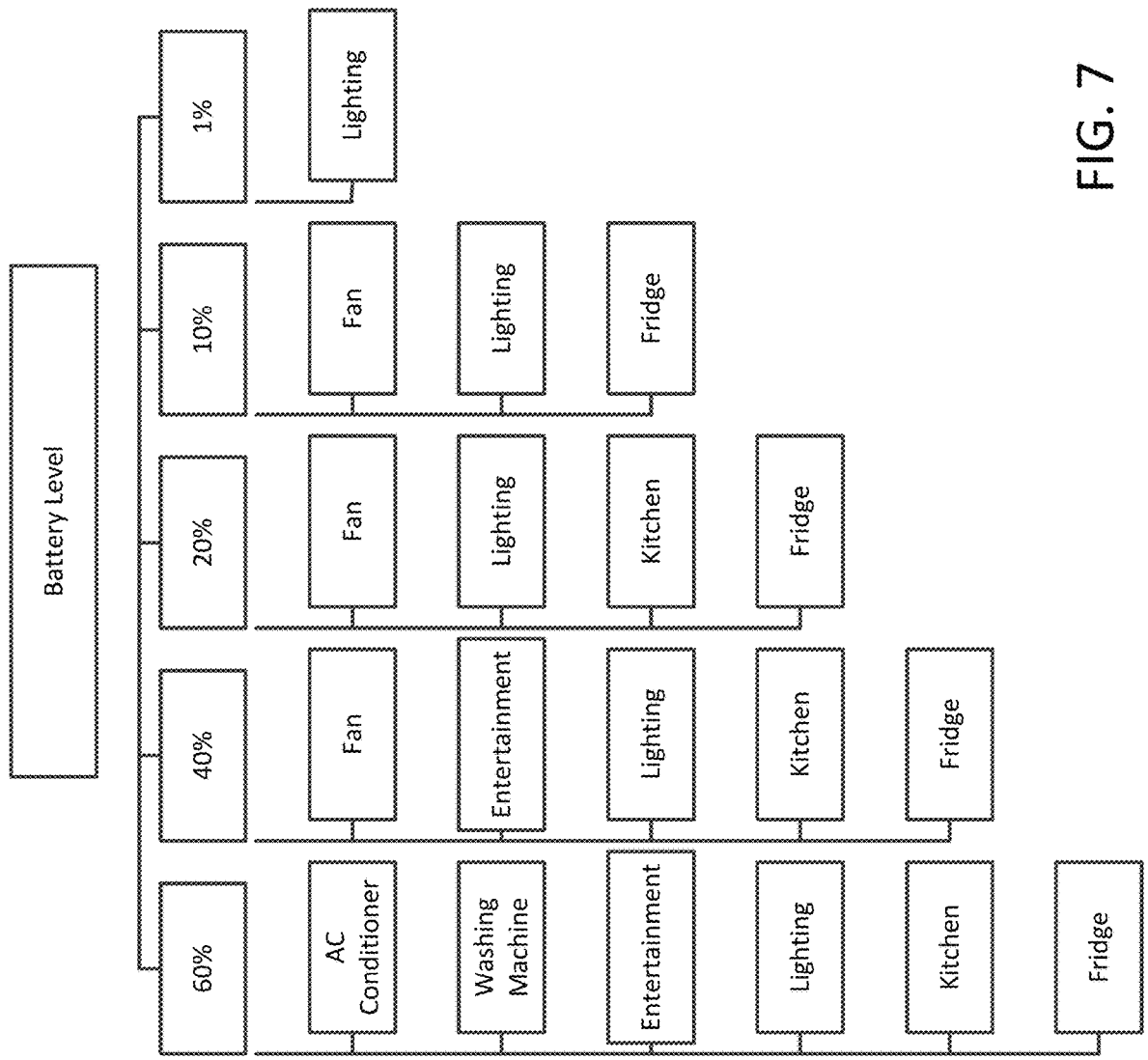
FIG. 7 is a chart showing priority level of system elements according to state of charge of battery energy level.

FIG. 7 is a chart showing priority level of system elements according to state of charge of battery energy level. The chart may reflect initial values that are setup when via a user interface displayed in the local user interface 109. Most electrical entities may remain operational as long as the remaining battery charge is above a predetermined level, such as 60%. As the remaining battery charge moves to below 40%, the washing machine may perform according to the operation in Table 3. Also, the air conditioner may be switched to operate in Fan mode. As the remaining battery charge moves to below 20%, the entertainment system may perform according to Table 2. As the remaining battery charge moves to below 10%, appliances in the kitchen may not be operated, except for the refrigerator. As the remaining battery charge moves to about 1%, only lighting may be operated.

The priority levels in FIG. 7 are provided as one example. The priority levels of electrical entities may be varied depending on time of day, for example, daytime, nighttime, dawn, and dusk. The priority levels of electrical entities may be varied depending on the load of other electrical entities as discussed further below.

Figure 8:
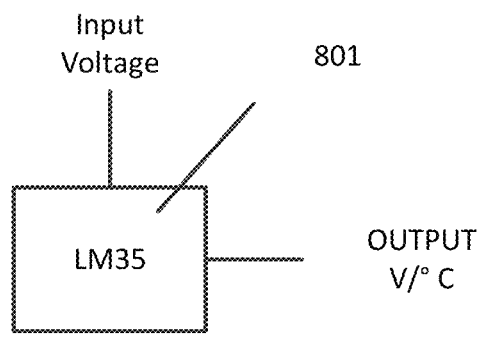
FIG. 8 is an exemplary temperature sensor.

FIG. 8 is an exemplary temperature sensor. In particular, an LM35 Temperature Sensor 801 is an example temperature sensor that produces an output voltage that is proportional to Celsius temperature. The device requires power in the range of 4-V to 30V. Typically, a household contains a single thermostat to regulate temperature. Temperature sensors may be used to determine temperatures in other sections of the household. There may be cases where persons are in their bedrooms. In such case, lighting in other sections of the house may not be necessary. Also, in such case availability of kitchen appliances may not be necessary. Priority of air conditioning may be raised so that if the temperature in one or more bedrooms exceeds a predetermined temperature, the air conditioning may be run while the load available for lighting, entertainment and kitchen appliances may be minimized.

Figure 9:
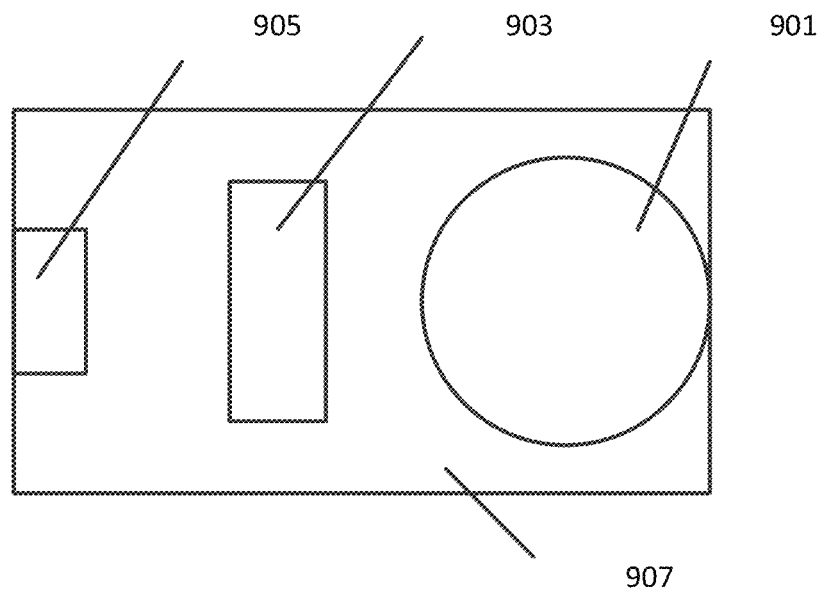
FIG. 9 is an exemplary motion sensor.

FIG. 9 is an exemplary motion sensor. In particular, a passive infrared (PIR) sensor is an example of a motion sensor that measures infrared light radiating from objects in its field of view. The PIR sensor 901 may be mounted on a printed circuit board 907 containing electronics 903 required to interpret the signals from the sensor. The circuit board 907 includes an input/output port 905. The assembly may be contained within a housing, mounted in a location where the sensor can cover area to be monitored. The housing may have a plastic window through which infrared energy can enter. The plastic used is transparent to infrared radiation. The window may serve as a focusing mechanism to focus distant infrared energy onto the sensor surface. The PIR may operate with a supply voltage of 5 to 12V and output a digital signal. A PIR-based motion detector may be used to sense movement of people, animals, or other objects. A motion detector may also be used to automatically activate lighting systems.

Figure 10:
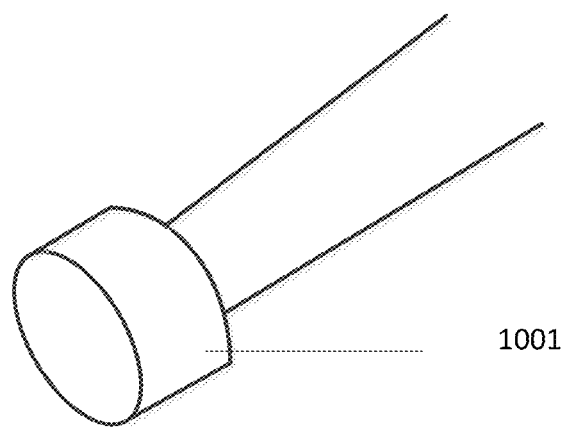
FIG. 10 is an exemplary light sensor.

FIG. 10 is an exemplary light sensor. In particular, a light dependent resistor (LDR) 1001 is a type of light sensor. The LDR 1001 is a light-controlled variable resistor. The LDR 1001 can be placed in lights to control when the light is turned on. Ambient light falling on the LDR 1001 may cause the light to turn off. Thus, energy may be saved by ensuring that light is only on during periods of darkness. Also, the LDR 1001 may exhibit a certain degree of latency between exposure to light and a decrease in resistance. This property smooths the response of the LDR 801.

The light sensor may indicate a degree of lightness. The control system 101 may use the degree of lightness and information about the time to categorize a time of day as being nighttime (low or no light), daytime (high brightness), dawn (morning time and low brightness), or dusk (evening time and low brightness). The range of time that constitutes morning or evening and the threshold for high or low brightness may be preset in the control system 101, or may be set with the user interface for setting up the energy management system.

Figure 11:
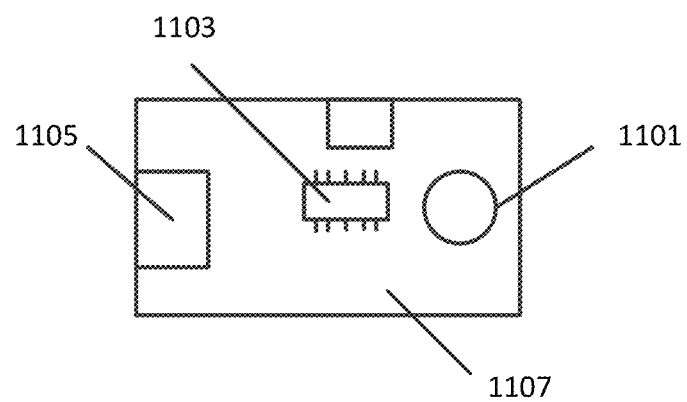
FIG. 11 is an exemplary air quality sensor.

FIG. 11 is an exemplary air quality sensor. The air quality characteristics detected by an air quality sensor may include the concentration of pollutants in air, as well as air temperature and humidity. Poor indoor air quality has been linked to potential health effects. In particular, pollutants such as carbon dioxide, carbon monoxide, organic chemicals, ozone, nitrogen oxides, and others may lead to adverse health effects, ranging from eye, nose and throat irritation to more severe illnesses such as respiratory infections, impaired vision and mental function, emphysema, lung cancer. Thus, an air quality sensor may be used to provide an indication of poor air quality. In one embodiment, an air quality sensor 1101 for detecting the amount of carbon dioxide ($CO_2$) in a room may be used as an indicator of an amount of pollution. The air quality sensor 1101 may be mounted on a circuit board 1107, which includes circuitry 1103 for interpreting signals from the sensor 1101 and an input/output port 1105. The air quality sensor 1101 may indicate pollution level as follows:

| $CO_2$ | Pollution Level |
|---|---|
| 0-3199 | Fresh Air |
| 3200-4799 | Low Pollution |
| 4800-6399 | Medium Pollution |
| 6400-11199 | High Pollution |
| 12200 and greater | Dangerous |

In cases where the pollution level is medium or high, the priority level of air conditioning may be raised above other electric entities even in the case that battery level is low. In the case that the pollution level is dangerous, an alarm may be activated.

Figure 12:
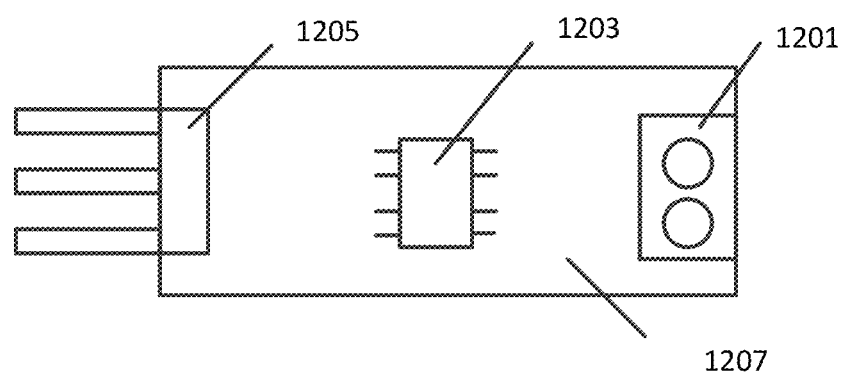
FIG. 12 is an exemplary current sensor.

FIG. 12 is an exemplary current sensor. A current sensor is a device that detects electric current in a wire and generates a signal proportional to the current. The generated signal could be analog voltage or current, or a digital output. A digital output is switched when the sensed current exceeds a certain threshold. In particular, ACS712 is a low-noise hall-effect current sensor. The ACS712 current sensor may operate with a 5V power. The current sensor 1201 may be mounted on a circuit board 1207, which includes circuitry 1003 for interpreting signals from the sensor 1201 and an input/output port 1205. The current sensor can be used to determine when to apply current to motor coils to control the motor. At a higher level, in cases where a motor driven appliance is being operated as indicated by current detected by the current sensor, but the remaining battery charge is below a predetermined amount, the appliance may be shut down or controlled to decrease the rate that current is being applied to the motor. In such case, the appliance may be operated to complete a task, such as washing clothes, but in a manner that energy usage is minimized until the state of charge of the battery has recovered to above a predetermined level.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. An off-electric-grid direct current (DC) electrical energy management system for a solar home, consisting of:
   a controller;
   a single solar panel mounted to the solar home;
   a charger controller;
   a local user interface;
   an output controller;
   a battery pack having one or more batteries that output a voltage based on load and have a linear relationship between output voltage and remaining capacity, the batteries being located in a control room of the solar home;
   wherein the single solar panel supplies electric power to be stored in the battery pack;
   one or more electric devices connected to the battery pack that produce the load by drawing electric power from the battery pack;
   one or more sensors, including temperature sensors and air quality sensors, motion sensors, light sensors, and current sensors, for monitoring conditions in the solar home;
   a control circuit configured to control the one or more electric devices based on the monitored conditions and the remaining capacity in the battery pack; and
   one or more relays configured to control DC to a subset of the one or more electric devices from the battery pack.

2. The off-electric-grid direct current (DC) electrical energy management system for a solar home of claim 1, wherein the solar home has a kitchen.

\* \* \* \* \*